(12) United States Patent
Hollar (10) Patent No.: US 10,451,706 B1
(45) Date of Patent: Oct. 22, 2019

(54) METHODS AND SYSTEMS FOR SELECTING THE SHORTEST PATH IN A MULTI-PATH ENVIRONMENT

(71) Applicant: Wiser Systems, Inc., Raleigh, NC (US)

(72) Inventor: Seth Edward-Austin Hollar, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 536 days.

(21) Appl. No.: 14/214,604

(22) Filed: Mar. 14, 2014

Related U.S. Application Data

(60) Provisional application No. 61/792,175, filed on Mar. 15, 2013.

(51) Int. Cl.
*G01S 5/02* (2010.01)

(52) U.S. Cl.
CPC .................................. *G01S 5/0215* (2013.01)

(58) Field of Classification Search
CPC .......... G01S 19/428; G01S 19/22; G01S 3/10; G01S 11/02; G01S 11/06; G01S 19/35; G01S 5/0215; G01S 5/0273
USPC .......................................................... 342/420
See application file for complete search history.

(56) References Cited

U.S. PATENT DOCUMENTS

| | | | | |
|---|---|---|---|---|
| 6,330,452 B1* | 12/2001 | Fattouche | .............. | G01S 1/045 455/456.1 |
| 7,292,189 B2* | 11/2007 | Orr | .................. | G01S 5/0215 342/387 |
| 7,515,103 B2* | 4/2009 | Luzzatto | ............... | G01S 11/06 342/458 |
| 8,138,975 B2* | 3/2012 | Bull | .................. | G01S 5/0215 342/450 |
| 8,436,768 B2* | 5/2013 | Bull | .................. | G01S 5/0221 342/357.25 |
| 8,743,976 B2* | 6/2014 | Smith | .............. | H04L 25/03343 375/259 |
| 9,274,207 B2* | 3/2016 | Boyd | ................ | G01S 5/021 |
| 9,699,607 B2* | 7/2017 | Markhovsky | ............ | G01S 3/46 |
| 2007/0173303 A1* | 7/2007 | Viorel | ............... | H01Q 1/246 455/575.7 |
| 2010/0277360 A1* | 11/2010 | Lee | .................. | G01S 5/0289 342/125 |

(Continued)

OTHER PUBLICATIONS

Allen Gregory Peters, Phased Array 802.11g Antenna, Master's Thesis, California Polytechnic State University—San Luis Obispo, Jun. 2010.

(Continued)

*Primary Examiner* — Bernarr E Gregory
*Assistant Examiner* — Nuzhat Pervin
(74) *Attorney, Agent, or Firm* — Stanek Lemon Crouse & Meeks, PA (57) ABSTRACT

Methods and systems are described for determining the shortest RF path in a multi-path environment. In an aspect a signal is transmitted by a transmitter. Multiple copies of the signal are received by a multi-directional receiver based on antenna elements that have a unique antenna pattern for each copy of the signal and where the copies are phase correlated and time synchronized. The copies are deconstructed into components of the reflected and line-of-sight waves of the transmitted signal. The shortest path is selected from among the reflected and line-of-sight waves using the deconstruction of the copies.

18 Claims, 8 Drawing Sheets

(56) References Cited

U.S. PATENT DOCUMENTS

| | | | |
|---|---|---|---|
| 2011/0111751 A1* | 5/2011 | Markhovsky | G01S 3/74 |
| | | | 455/423 |
| 2011/0286508 A1* | 11/2011 | Smith | H04L 25/03343 |
| | | | 375/224 |
| 2012/0319903 A1* | 12/2012 | Huseth | G01S 3/74 |
| | | | 342/386 |
| 2013/0023285 A1* | 1/2013 | Markhovsky | G01S 3/74 |
| | | | 455/456.1 |

OTHER PUBLICATIONS

Blanco, Marc; Kokku, Ravi; Ramachandran, Kishore; Rangarajan, Sampath; Sundaresan, Karthik, "On the effectiveness of switched beam antennas in indoor environments," Lecture Notes in Computer Science (including subseries Lecture Notes in Artificial Intelligence and Lecture Notes in Bioinformatics), v 4979 LNCS, p. 122-131, 2008, Passive and Active Network Measurement—9th International Conference, PAM 2008, Proceedings.

Hemarsri Kollipara, "Design of a Uniform Circular Phased-Array Smart Antenna for 2.4 GHz Applications," Master Thesis, University of Texas at Tyler, Aug. 2011. http://dspace.uttyler.edu/xmlui/bitstream/handle/10950/46/Kollipara_Hemasri.pdf.

Kurek, Krzysztof; Yashchyshyn, Yevhen; Kondrak, Grzegorz; Modelski, Jozef, "Investigation of 2D phased smart antenna array for LEO satellite system," Wireless Technology 2005, Conference Proceedings—8th European Conference on Wireless Technology, v 2005, p. 77-80, 2005, Wireless Technology 2005, Conference Proceedings—8th European Conference on Wireless Technology.

Liu, Xi; Sheth, Anmol; Kaminsky, Michael; Papagiannaki, Konstantina; Seshan, Srinivasan; Steenkiste, Peter, "DIRC: Increasing indoor wireless capacity using directional antennas" Computer Communication Review, v 39, n 4, p. 171-182, 2009, SIGCOMM 2009—ACM SIGCOMM 2009 Conference on Data Communication.

Liu, Xi; Sheth, Anmol; Kaminsky, Michael; Papagiannaki, Konstantina; Seshan, Srinivasan; Steenkiste, Peter, "Pushing the envelope of indoor wireless spatial reuse using directional access points and clients," Proceedings of the Annual International Conference on Mobile Computing and Networking, MOBICOM, p. 209-220, 2010, MobiCom'10 and MobiHoc'10—Proceedings of the 16th Annual International Conference on Mobile Computing and Networking and 11th ACM International Symposium on Mobile Ad Hoc Networking and Computing.

Navda, Vishnu; Subramanian, Anand Prabhu; Dhanasekaran, Kannan; Timm-Giel, Andreas; Das, Samir, "MobiSteer: Using steerable beam directional antenna for vehicular network access," MobiSys'07: Proceedings of the 5th International Conference on Mobile Systems, Applications and Services, p. 192-205, 2007, MobiSys'07: Proceedings of the 5th International Conference on Mobile Systems, Applications and Services.

Nemec, Z.; Dolecek, R., "The time difference of arrival estimation of Wi-Fi signals using received signal decomposition on delayed replicas," BEC 2008—2008 International Biennial Baltic Electronics Conference, Proceedings of the 11th Biennial Baltic Electronics Conference, p. 243-246, 2008, BEC 2008—2008 International Biennial Baltic Electronics Conference, Proceedings of the 11th Biennial Baltic Electronics Conference.

Ramachandran, Kishore; Kokku, Ravi; Sundaresan, Karthikeyan; Gruteser, Marco; Rangarajan, Sampath, "R2D2: Regulating beam shape and rate as directionality meets diversity," MobiSys'09—Proceedings of the 7th ACM International Conference on Mobile Systems, Applications, and Services, p. 235-248, 2009, MobiSys'09—Proceedings of the 7th ACM International Conference on Mobile Systems, Applications, and Services.

Sen, Souvik, "Link layer multicasting with smart antennas: No client left behind," PhD Dissertation, Duke University, 2009.

Sheth, Anmol; Seshan, Srinivasan; Wetherall, David, "Geo-fencing: Confining Wi-Fi coverage to physical boundaries," Lecture Notes in Computer Science (including subseries Lecture Notes in Artificial Intelligence and Lecture Notes in Bioinformatics), v 5538 LNCS, p. 274-290, 2009, Pervasive Computing—7th International Conference, Pervasive 2009, Proceedings.

Sriram Lakshmanan, Karthikeyan Sundaresan, Sampath Rangarajan, Raghupathy Sivakumar, "Practical beamforming based on RSSI measurements using off-the-shelf wireless clients," ACM 2009 Article, IMC '09 Proceedings of the 9th ACM SIGCOMM conference on Internet measurement conference, pp. 410-416, ACM New York, NY, USA 2009.

Subramanian, Anand Prabhu; Deshpande, Pralhad; Gao, Jie; Das, Samir R., "Drive-by localization of roadside WiFi networks," Proceedings—IEEE INFOCOM, p. 1391-1399, 2008, INFOCOM 2008: 27th IEEE Communications Society Conference on Computer Communications.

Subramanian, Anand Prabhu; Navda, Vishnu; Deshpande, Pralhad; Das, Samir R., "A measurement study of inter-vehicular communication using steerable beam directional antenna," VANET'08—Proceedings of the 5th ACM International Workshop on Vehicular Inter-Networking, p. 7-16, 2008, VANET'08—Proceedings of the 5th ACM International Workshop on Vehicular Inter-Networking.

Timm-Giel, Andreas; Subramanian, Anand P.; Dhanasekaran, Kannan; Navda, Vishnu; Das, Samir R, "Directional antennas for vehicular communication—Experimental results," IEEE Vehicular Technology Conference, p. 357-361, 2007, 2007 IEEE 65th Vehicular Technology Conference—VTC2007—Spring.

Zhang, Honghai; Jiang, Yuanxi; Sundaresan, Karthik; Rangarajan, Sampath; Zhao, Baohua, "Wireless data multicasting with switched beamforming antennas," Proceedings—IEEE INFOCOM, p. 526-530, 2011, 2011 Proceedings IEEE INFOCOM.

Holly Hui Jin, Scalable Sensor Localization Algorithms, Dissertation, Stanford 2005.

Iwakiri, N.; Kobayashi, T.; "Joint TOA and AOA/AOD Spectrum for Ultra-Wideband Indoor Double-Directional Channel Estimation", Vehicular Technology Conference, 2008. VTC 2008—Fall. IEEE 68th.

Lanzisera, Steven Michael. RF Ranging for Location Awareness, Doctor of Philosophy in Engineering—Electrical Engineering and Computer Science, UC Berkeley, Spring 2009.

Qiaowei Yuan, Qiang Chen, K. Sawaya, Accurate DOA Estimation Using Array Antenna With Arbitrary Geometry, IEEE Transactions on Antennas and Propagation, vol. 53, No. 4, Apr. 2005.

Udar, N., Kant, K, Viswanathan, R., Cheung, D. Ultra Wideband Channel Characterization and Ranging in Data Centers, , ICUWB 2007 IEEE International Conference on Ultra Wideband, 2007.

Vanderveen, M.C. Papadias, C.B. Paulraj, A., "Joint angle and delay estimation (JADE) for multipath signals arriving at an antenna array," Communications Letters, IEEE, Jan. 1997, vol. 1, pp. 12-14, Aug. 6, 2002.

H.K. Hwang and Zekeriya Aliyazicioglu, "Direction of arrival estimation using a phase array antenna," in Trends in Communication Technologies and Engineering Science, Chapter 16, p. 205, Hwang, H.K.1 ; Lecture Notes in Electrical Engineering vol. 33, 2009.

Zhao Jia, Yang Jing-shu, "Blind DOA Estimation Based on JADE Algorithm in Multi-path Environment," 2010 Conference on Computing, Control and Industrial Engineering (CCIE), 2010 vol. 1 pp. 141-144, 2010.

Spencer, Q.; Rice, M.; Jeffs, Brian; Jensen, M., "A statistical model for angle of arrival in indoor multipath propagation," Vehicular Technology Conference, 1997, IEEE 47th 1997, vol. 3, pp. 1415-1419.

Alasiry, A.H.; Sang-il Ko; Thanh, H.P.; Takayama, J.; Ohyama, S., "Wireless sensor networks nodes localization based on inter-node RF range measurement using Vernier effect," ICACSIS 2011, 2011, pp. 277-282.

\* cited by examiner

Figure 1

[1] $\quad \text{Phase} = 2\pi(ft - \frac{x}{\lambda})$

[2] $\quad \text{Phase}_{LOS} = 2\pi(ft - \frac{d_{LOS}}{\lambda})$

[3] $\quad \text{Phase}_{reflect} = 2\pi(ft - \frac{d_{reflect}}{\lambda})$

[4] $\quad \Delta\text{Phase} = \text{Phase}_{reflect} - \text{Phase}_{LOS} = \frac{2\pi}{\lambda}(d_{LOS} - d_{reflect})$

[5] $\quad \Delta\text{Phase}(f) = \frac{2\pi f}{c}(d_{LOS} - d_{reflect})$ where: f is frequency
c is speed through medium
$d_{LOS}$ is path distance of line-of-sight wave
$d_{reflect}$ is path distance of reflected wave

[6] $\quad \Delta\text{Phase}(f) = \frac{2\pi f}{c}(d_{LOS} - d_{reflect}) + \Phi_{offset}$

[7] $\quad \Delta\text{Phase}(f_1) - \Delta\text{Phase}(f_2) = \frac{2\pi}{c}(f_1 - f_2)(d_{LOS} - d_{reflect})$

METHODS AND SYSTEMS FOR SELECTING THE SHORTEST PATH IN A MULTI-PATH ENVIRONMENT

CROSS-REFERENCE TO RELATED APPLICATIONS

This application claims the benefit of and priority to Provisional Application Ser. No. 61/792,175, filed on Mar. 15, 2013, entitled "Location System Based on the Selection of the Shortest Path in a Multi-path Environment Through Angular Deconstruction of Narrow Band Signals," the contents of which is incorporated herein by reference as if set forth in its entirety.

FIELD

The present inventive concept relates generally to real-time location systems and, more particularly, to methods for selecting paths in a multi-path environment and related systems.

BACKGROUND

Global positioning systems (GPS) are very effective in outdoor environments due to the readily available line-of-sight signal from the satellites. However, indoors, the GPS accuracy drops primarily due to poor signal strength and multi-path reflections. The multi-path reflections, in particular, cause a longer perceived flight delay which significantly erodes performance. A number of algorithms have been employed to reduce the effects of multi-path delays, but they rely solely on the single antenna of the GPS system. A system that captures signals over small frequency fluctuations from a multi-antenna based receiver can reduce the impacts of multi-path reflections by employing algorithms that deconstruct the signals over spatial angles. Once the reflected and line-of-sight signals are deconstructed, the phase differences of the signals can be used to determine the shortest signal path from the transmitter to the receiver.

SUMMARY

The following presents a simplified summary of the disclosure in order to provide a basic understanding to the reader. This summary is not an extensive overview of the disclosure and it does not identify key/critical elements of the inventive concept or delineate the scope of the inventive concept. Its sole purpose is to present some concepts disclosed herein in a simplified form as a prelude to the more detailed description that is presented later.

Some embodiments of the present inventive concept include systems, methods and computer program products to determine the shortest RF path in a multi-path environment. The inventive concept has related applications to real time location systems and object detection among others. In operation, a system comprises a transmitter which is received by one or more antennas with receiver units. A processor unit executes logic to determine the shortest path of the free-space.

Further embodiment provide methods including transmitting a signal which is received from one or more antennas, executing deconstructor logic to determine free-space waves, and then applying comparing logic to determine the shortest path of the free-space waves.

Still further embodiments provided methods including transmitting a signal, receiving said signal unit from receiver dispersed through an environment, sending signal data to a centralized processor unit, applying deconstructor logic to determine the free-space waves, and then applying object logic to determine the location of objects.

BRIEF DESCRIPTION OF THE DRAWINGS

Objects and advantages of the present inventive concept may become apparent to those skilled in the art upon reading this description in conjunction with the accompanying drawings, and in which.

DETAILED DESCRIPTION

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

In some embodiments, a system includes a mobile wireless transmitter that, for example, can transmit a packet or continuous stream in a narrow band frequency to a receiver. The receiver is herein referred to as a multi-directional receiver unit (MDRU). In some embodiments, an MDRU may receive more than one signal either simultaneously or in sequence. In some embodiments, a radio frequency (RF) front end of an MDRU may capture a signal from an antenna. An analog to digital (A/D) converter may convert the signal into a data stream. The data stream is then the result of the RF signal captured through one of the antennas.

If an MDRU has more than one RF Front End, an MDRU can receive multiple signals simultaneously.

In some embodiments, an MDRU can receive one signal at a time, via an antenna with a pattern that is changed over time. An example of a changing antenna pattern is a fixed antenna mounted on a mechanized rotating turn table. For example, a RF front end may be coupled to an antenna that provides a signal to a pre amplifier with a mixer to down convert signal to an intermediate frequency (IF). The A/D converter can then convert the IF signal into a digital data stream. The MDRU can have a synchronizing clock reference that feeds into the A/D forcing the signals to be sampled at the same time. For each mixer, the RF front end may contain a local oscillator to down-convert the RF signal. To maintain phase correlation of the IF signal, the IF front ends can use the same local oscillator. Alternatively, all the local oscillators within the MDRU can be phase correlated by phase-shifting circuitry that uses the MDRU's common synchronizing clock reference.

Figure 1:
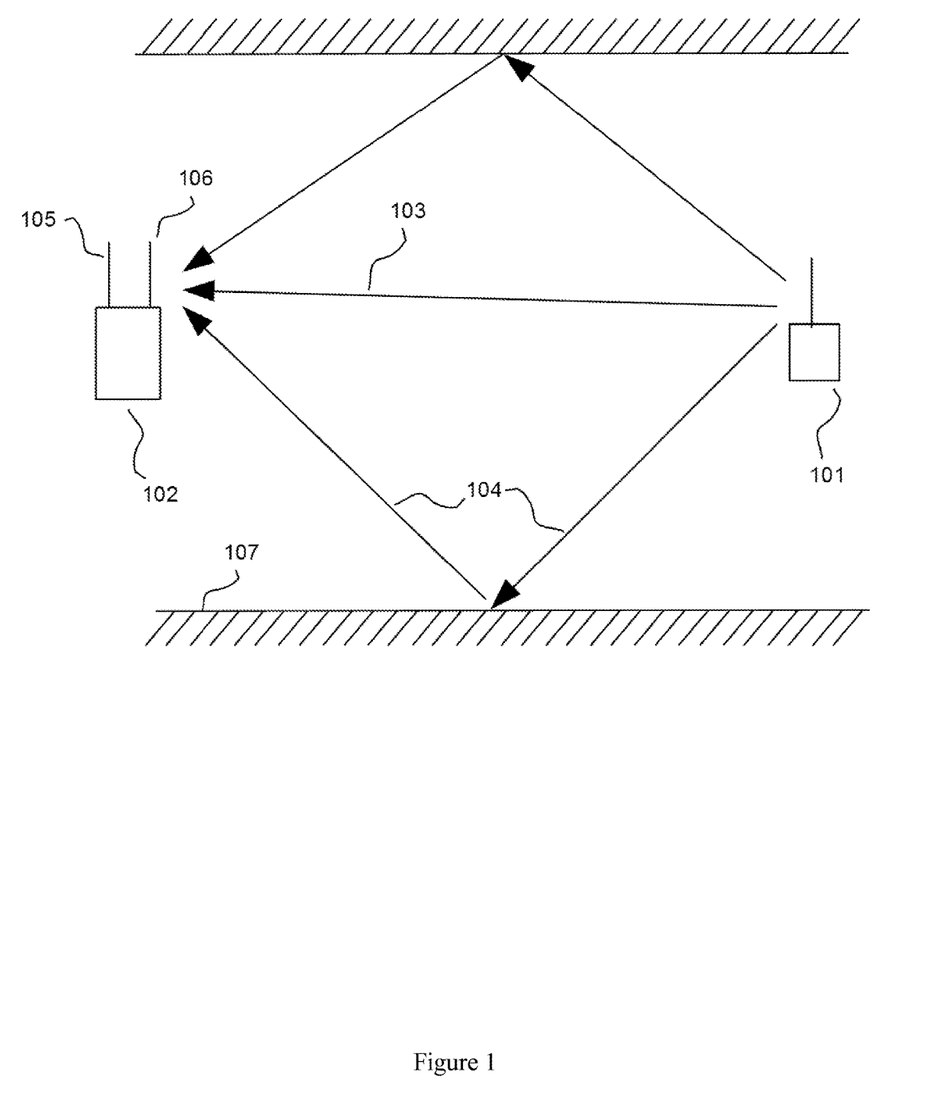
FIG. 1 is a diagram illustrating a system including a transmitting device and receiving device according to some embodiments of the present inventive concept.

Referring now to FIG. 1, a diagram illustrating a system including a transmitting device and receiving device according to some embodiments of the present inventive concept will be discussed. As illustrated in FIG. 1, element 101 is the transmitter which may be mobile and element 102 is the MDRU. During transmission, the transmitter 101 emits signals in all directions. The free space wave 103 is the direct line-of-sight (LOS) wave. The free space wave 104 is a reflected wave which has bounced off the floor 107 before reaching the MDRU 102. As illustrated, the MDRU 102 includes two antennas 105 and 106. Antenna 105 may receive both free space waves 104 and 103, so the resulting RF signal from antenna 105 may be a composite of the LOS and reflected waves. Likewise, antenna 106 may receive both LOS and reflected free space waves, and the resulting RF signal from antenna 106 may be a composite of the LOS and reflected waves. The RF signal of the antenna 105 may also depend on the antenna pattern of 105. Each antenna of a given receiver may have a unique antenna pattern. An antenna pattern may describe the phase and reception strength for each direction of an incoming signal.

A signal from each antenna may be converted into a data stream by an A/D converter. The data stream can then be sent to a computational element. For example, the data stream may sent to a computational element via an Ethernet connection. Alternatively, the RF front end may be integrated directly onto the same PCB board as the processor element. A computational element may be in the form of a microprocessor, multi-core graphics processor, ASIC, FPGA, or a digital signal processor. An example of an RF Front End may be a software defined radio (SDR). SDRs, for example, may contain an antenna, a mixer, and an A/D converter. An Ethernet cable may connect the SDR to computing hardware through which the data streams may be sent. The computing hardware may contain an Ethernet controller, RAM, and microprocessor. The processor may have access to the data streams and the associated antenna patterns for the corresponding antenna's data stream. The processor processes deconstructor logic that when executed deconstructs data streams into separate components representing free space waves that contributed to the formation of the RF signal. A deconstructor logic may determine phase, magnitude, and the angle-of-arrival of free space waves, to identify an LOS wave and a reflected waves. In some embodiments, a processor executing deconstructor logic may process a data stream iteratively. A received signal from each antenna when the corresponding antenna pattern is applied may be approximated or otherwise determined based on the superposition of free space waves added together.

For example in FIG. 1, free space waves 103 and 104 arriving from different angles may be detected by the receiver. Deconstructor logic may process data streams from each antenna to deconstruct received signals into discrete free-space waves.

Once deconstructor logic deconstructs the received signals into reflected and LOS waves, comparing logic may compare one or more attributes of the waves to determine which wave represents the free-space shortest path. Example attributes that the comparing logic may process include one or more of the following: phase, magnitude, angle-of-arrival, and packet envelop of the wave.

Figure 2:
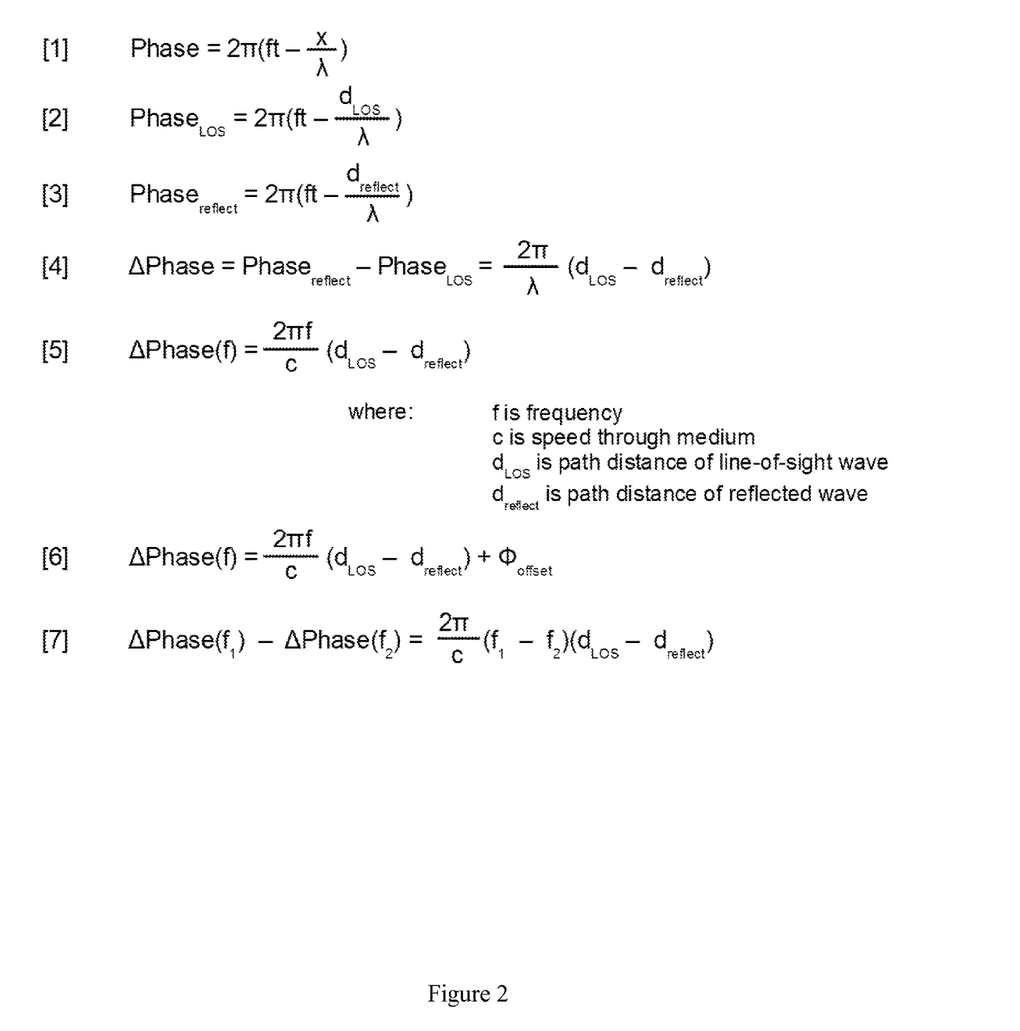
FIG. 2 is a series of equations illustrating one set of equations for calculating phase difference in accordance with some embodiments of the present inventive concept.

Referring now to FIG. 2, example equations for comparing the phase of two signals, in this example the LOS signal and a reflected signal, will be discussed. Equation 1 is the phase for a traveling sinusoidal wave that depends on time and distance. Equation 5 outlines the difference of the phases of the two waves. The difference in phase can be a function of "f" the frequency of a single component of the wave, "$distance_{LOS}$" the LOS free space path distance, "$distance_{reflected}$" the reflected free space path distance, and "c" the speed through the medium. If "$distance_{LOS}$" is less than $distancer_{eflected}$, then the phase difference may be negative. The comparing logic can include instructions based on these equations in determining the shortest path of a free space wave. However, the phase difference can be greater than 2 pi and even with phase coherent systems, offset phase constants can be injected into the phase difference equation. Therefore, the comparing logic can compare the differences of the phase difference over frequency. In equation 5, it is noted that as f increases so does the phase difference. Therefore, if the transmitter transmits at two carrier frequencies that are very close to one another, the comparing logic can detect the incremental differences in phase differences between these two frequencies. This method can be applied within narrow frequency bands. Equation 6 shows the addition of a constant phase offset between the two signals. In equation 7, the comparing logic can calculate the difference of the phase differences for different frequencies. The transmitter can emit carrier waves whose differences in frequencies are arbitrarily small to produce phase differences that are within 2 pi. Additionally, the constant phase offset also cancels. Namely, the comparing logic can determine the shortest path by considering the difference of phase differences. In particular, the logic may detect the shortest path when a negative value results from the difference of the phase differences when an LOS wave is compared to any other reflected wave (Equation 7).

Embodiments discussed above use a sinusoidal waveform, but some embodiments may include other waveforms such that phase elements can be deciphered from the waveform. One example to decipher phase elements may include the Fourier transform to decompose an arbitrary waveform into frequency components. This is also an example of how larger frequency bands may be used to decipher phase differences. In some embodiments, a large frequency band may contain a large number of distinct frequency channels in which a large number of free-space waves are deconstructed for the purpose of calculating the shortest path.

GPS uses satellites to transmit to receivers on Earth for global positioning. In some embodiments, an MDRU is part of a GPS receiver, receiving one or more satellite GPS signals. The resulting signal and data stream is processed by a processor employing deconstructor logic to deconstruct the GPS signal into free-space waves. Comparing logic is applied to determine the free-space wave which has the shortest path. Parameters of the shortest path free-space wave may include phase which a GPS receiver can use to more precisely determine the timing of the incoming GPS signal from the satellite resulting in greater location accuracy of GPS receiver.

Figure 3:
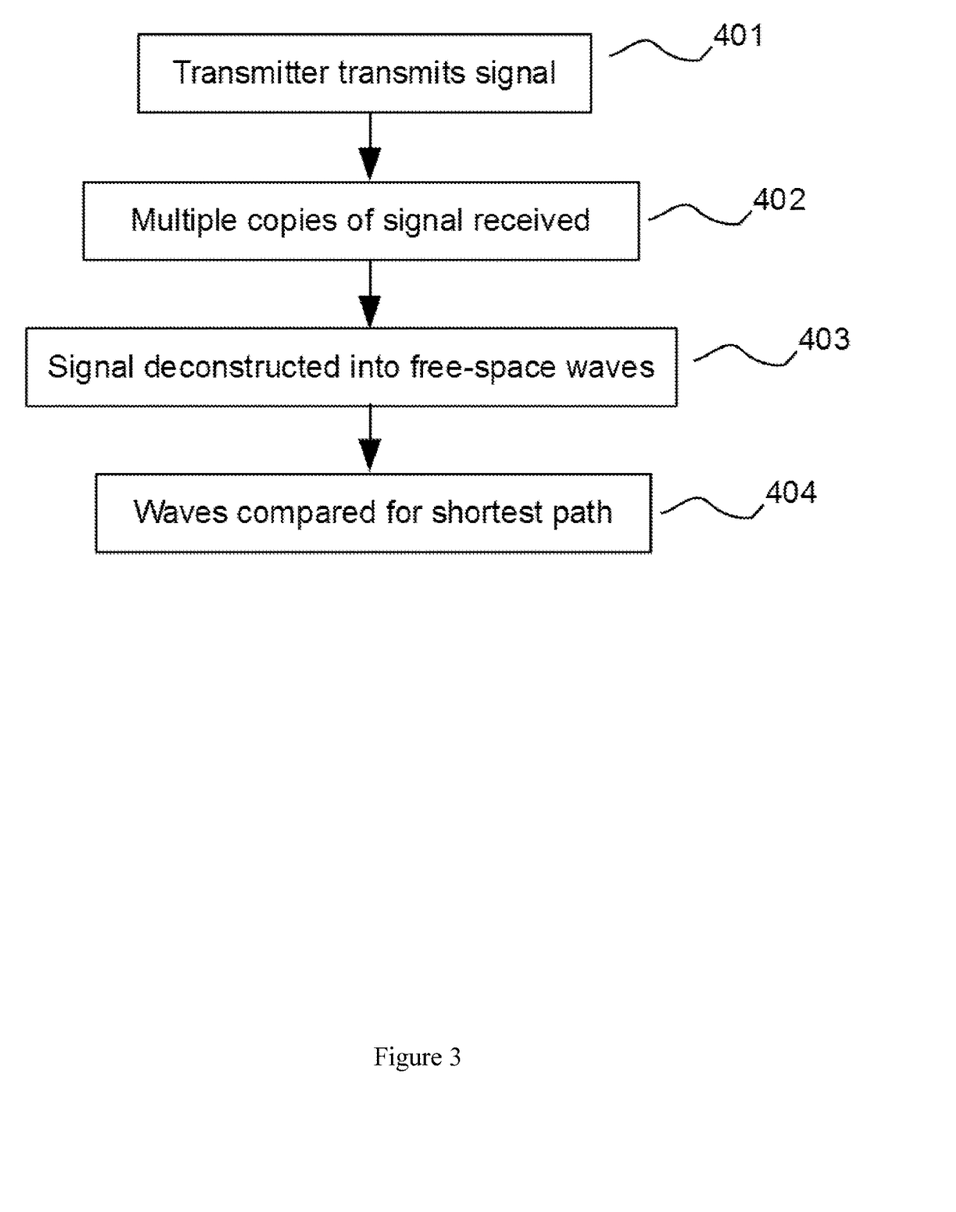
FIG. 3 is a flowchart illustrating operations of a method to determine the shortest path according to some embodiments of the present inventive concept.

Referring now to FIG. 3, a flowchart illustrating operations for methods to determine the shortest path in accordance with some embodiments of the present inventive concept. Initially a signal is transmitted from a transmitter (401). The signal is received from multiple antennas on the MDRU (402). The captured signals may be converted through an A/D converter into a data stream and then sent to a processor for processing. The receivers may be phase correlated, and all the A/D converters may be synchronized to sample at the same time. Deconstructor logic is applied in a processor to render characteristics of the free-space waves which may represent the reflected and line of sight (LOC) waves of the transmitted signal (403). Comparing logic that uses the characteristics of the free-space waves may then select the wave with the shortest path which may be the line-of-sight wave (404).

Figure 4:
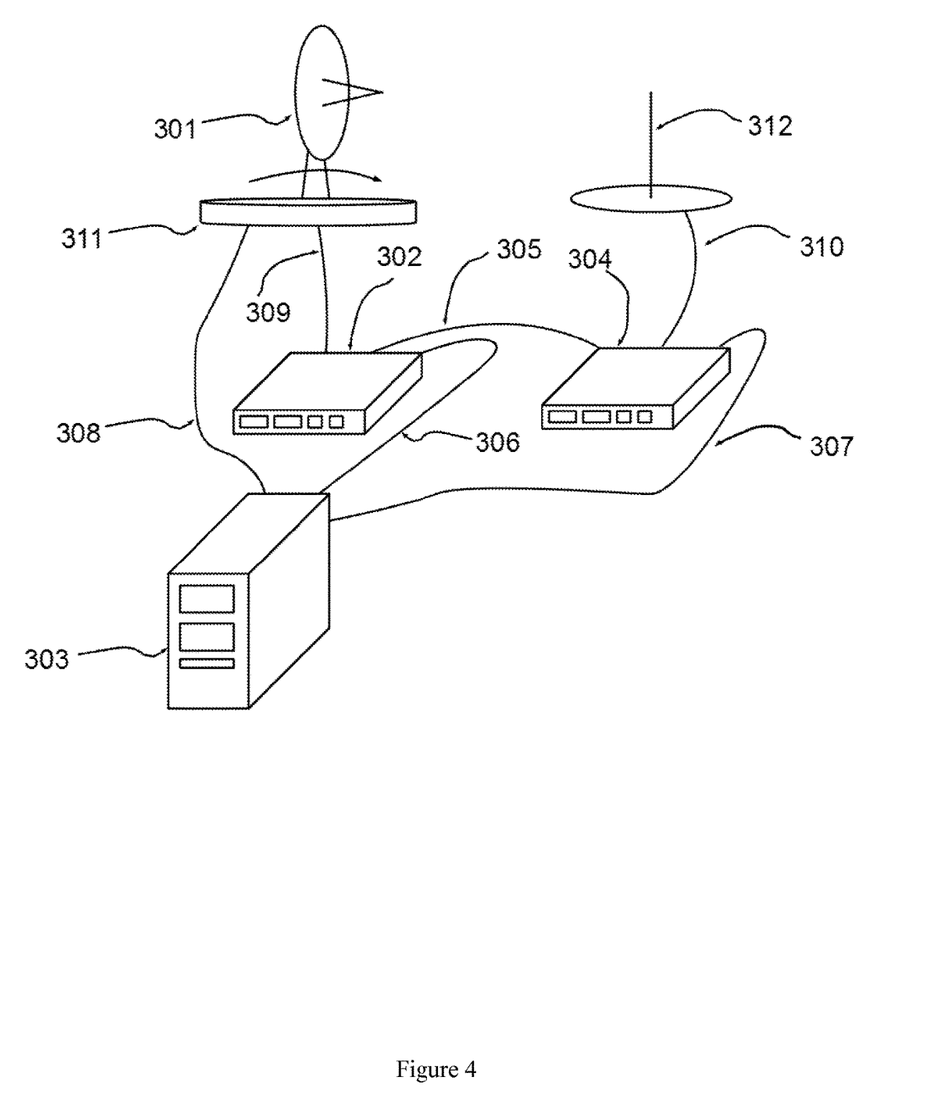
FIG. 4 is a block diagram of a system including a receiver according to some embodiments of the present inventive concept.

Referring now to FIG. 4, an example setup of a MDRU in accordance with some embodiments will be discussed. As illustrated, two receivers 302 and 304 are phase correlated and clock synchronized. The sync cable 305 is used to synchronize the internal clocks. The first antenna 301 is, for example, a highly directional antenna, is connected to a motorized rotating table 311 which receives motor commands from the cable 308. The cable may be any standard for sending digital data, for example, a USB cable. Elements 309 and 310 are RF cables that connect the antennas to each of the receiving units 302 and 304. An example of a cable may be an SMA terminated 50 ohm cable. The antenna 312 is an omni-directional antenna. The computational unit 303 houses the processor to run the algorithms that receive data from 302 from the cable 306, receive data from 304 from the cable 307, and control the motor from the cable 308. In these embodiments, the transmitter (not shown) sends out continuously two sine waves within a narrow frequencies range. For any given instant, antenna 301 is oriented in a specific direction, and both antennas 312 and 301 receive a signal. The resulting data streams represent the sinusoid signals from the respective antennas. Logic in the computational element 303 can be used to compare the relative phase differences of the two sinusoidal waves of the signals received from the two antennas. As the directional antenna is rotated, the receiver captures and digitizes a new signal sample so the relative phase difference between the directional antenna 301 and the unidirectional antenna 312 may be different. However since the omnidirectional antenna has not changed position, the phase difference is related to the difference in phases between the old position and the new position of the antenna 301. In this way, the antenna 312 acts as a reference phase. As the motorized controller 308 rotates the antenna 301 through a sweep of angles, logic can calculate the relative phase differences between the 301 and 312 over a sweep of angles. The antenna system 312, 310, and 304 are used as a phase reference in this example, but other embodiments can replace these elements with similar effects. For example, a highly accurate clock that stays precise within the time it takes to take measurements through the entire rotation of the antenna. Such a clock may be an atomic clock. As another example, the system may maintain precise timing with the use of a means to communicate and use the Precision Timing Protocol from IEEE 1588. An Ethernet cable or some form of wireless communicate may be used.

In some embodiments, phased array antennas may act as the antennas for the MDRU. Both a single array or a dual array of antennas may be used.

Figure 5:
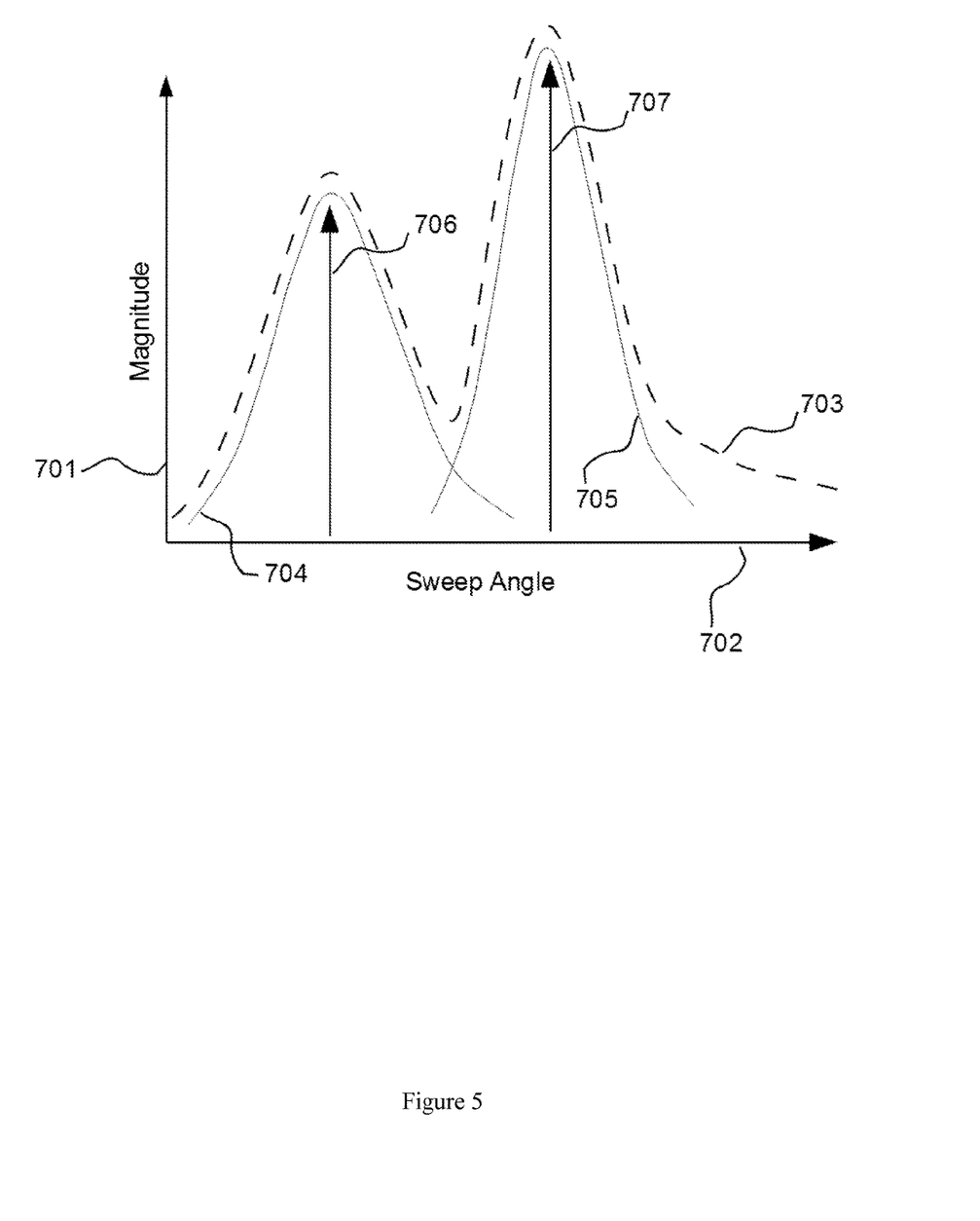
FIG. 5 is a graph of sweep angle versus magnitude illustrating exemplary reconstructed free-space waves according to some embodiments of the present inventive concept.

Referring now to FIG. 5, a graph of sweep angle versus magnitude illustrating magnitude of received signals from a single antenna rotating from 0 to 180 degrees will be discussed. For each receiving angle, the receiver unit may capture a data stream which may contain the magnitude and phase of the received signal. The graph's y-axis (701) is the magnitude of the received signal, and the x-axis (702) represents the sweep angle. The dashed envelope (703) shows the magnitude of each received signal as a function of angle. Though phase of the signals are not shown, deconstructor logic may take as inputs the magnitude data (703) and the phase information and calculate parameters for the free-space waves 706 and 707. Such parameters may include the incident 1) angle-of-arrival, 2) magnitude, and 3) phase. Comparing logic may then use these parameters to determine the free-space wave which corresponds to the shortest path. To show how the free-space waves can represent the magnitude envelope 703, the antenna pattern of the MDRU affects the free-space wave by distributing the signal across multiple receiving angles. For unidirectional antennas, the antenna pattern may be peaked at the center of the receiving angle and tapers off as the angle increases from the center. For example, free-space wave 706's contribution to the magnitude envelope 703 is represented by 704. Free-space wave 707's contribution is represented by 705. Magnitude envelope 703 is then the composite of 704 and 705. The received signals which can be represented by magnitude and phase may then be reconstructed from free-space waves 704 and 705 through superposition.

Figure 6:
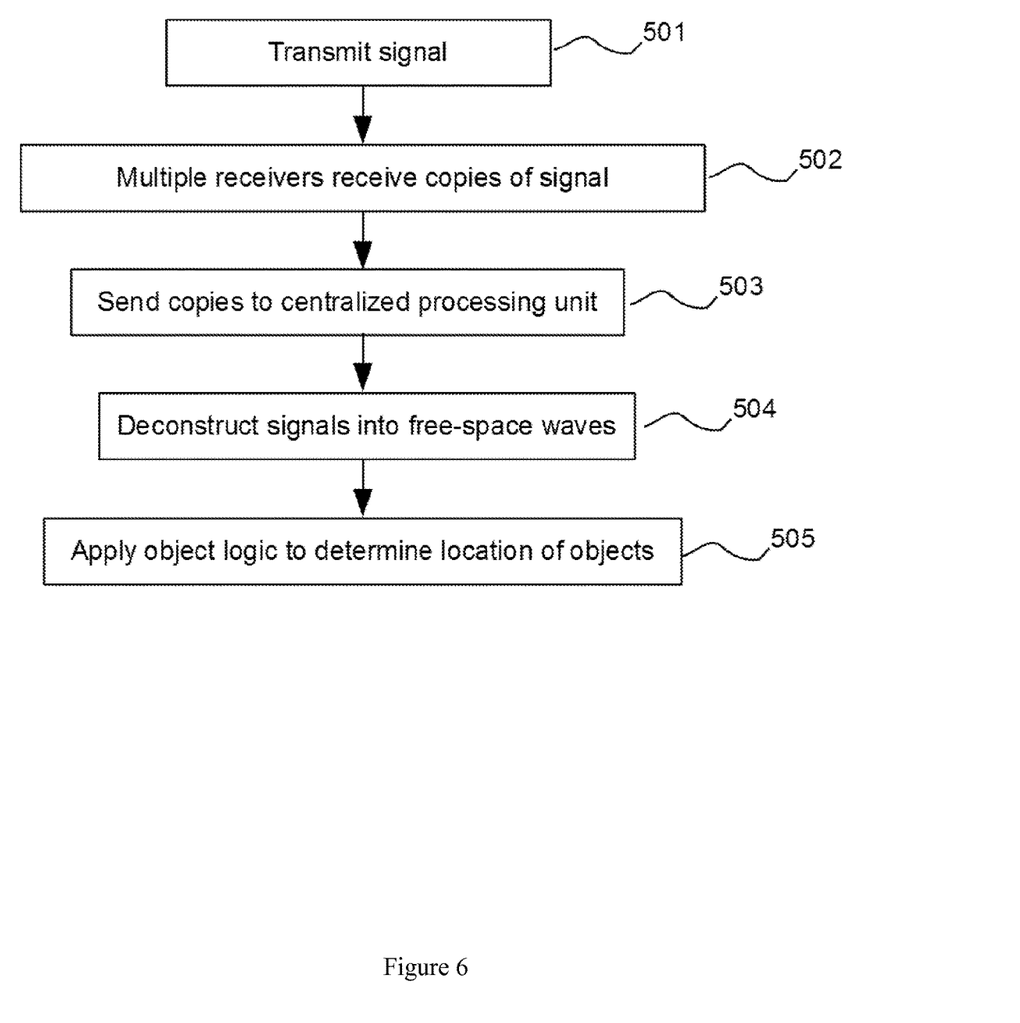
FIG. 6 is flowchart illustrating operations of a method to determine the location of objects according to some embodiments of the present inventive concept.

In addition to identifying the shortest path of a free-space wave, some embodiments may be used to identify objects in an environment. Referring now to FIG. 6, a flowchart illustrating embodiments of such a method will be discussed. Initially, a transmitter emits a signal (501). The transmitter's location may be known. In the environment, there could exist multiple receivers where each receiver may contain one or more antennas and the receivers' location may also be known. Additionally, the receivers (whether or not they are connected), may be synchronized in time. The transmitted signals are captured by each of the receivers. The signals may also be phase correlated, and the signals may be converted digitally to data streams by an A/D processor. The data streams may be sent to a central processing unit (503). If the receivers are separated by some distance, a wireless communication link or an Ethernet cable may be used. Deconstructor logic may be used to deconstruct the signals from each of the receivers to free-space waves (504). One example of deconstructor logic may include modeling the environment by the superposition of free-space waves that could accumulate within a single receiver antenna. The resulting characteristics of the free-space waves may be used as one factor in object logic used to determine the location of objects in an environment (505).

Figure 7:
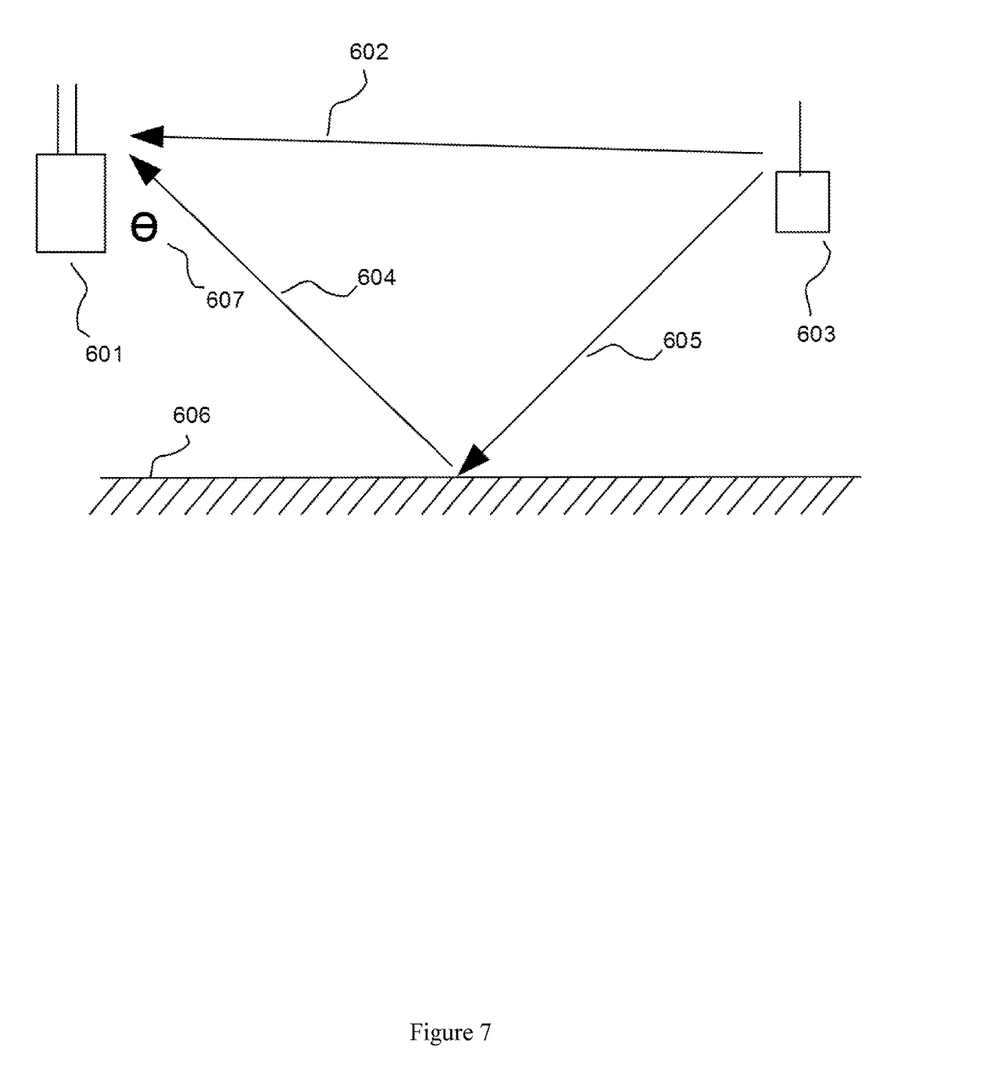
FIG. 7 is a diagram illustrating a method to detect an object from reflected and line-of-sight waves in accordance with some embodiments of the present inventive concept.

An example of object logic used to determine an object's location in the environment is shown in FIG. 7. Element 603 is a transmitter and element 601 is a MDRU. Element 602 represents the LOS free-space wave and elements 604 and 605 represent both parts of the reflected free-space wave. The reflected wave bounces off of the surface 606. The location of the antennas for 603 and 601 are known. Therefore, the length of 602 can be calculated. Furthermore, the deconstructor logic provides phase and the angle-of arrival for both free-space waves. The difference is path distance between 602 and 604+605 is related to the phase difference multiplied by the wavelength of the carrier frequency. Since the length of 602 is known, the length of 604+605 is also known. Lastly, the deconstructor logic calculated the angle of arrival of 604 which is denoted by theta (607) in the figure. Additionally, 602, 604, and 605 all make up sides of a triangle. The object logic may then calculate the point at which the reflection occurs by employing calculations related to solving for sides of a triangle.

A single point for an object may be an insufficient picture of objects in the environment, but in some embodiments, multiple transmitters and/or receivers could be used. Alternatively, the transmitter and/or receivers could be mobile and move around the environment slowly building up a map of all the obstacles.

Figure 8:
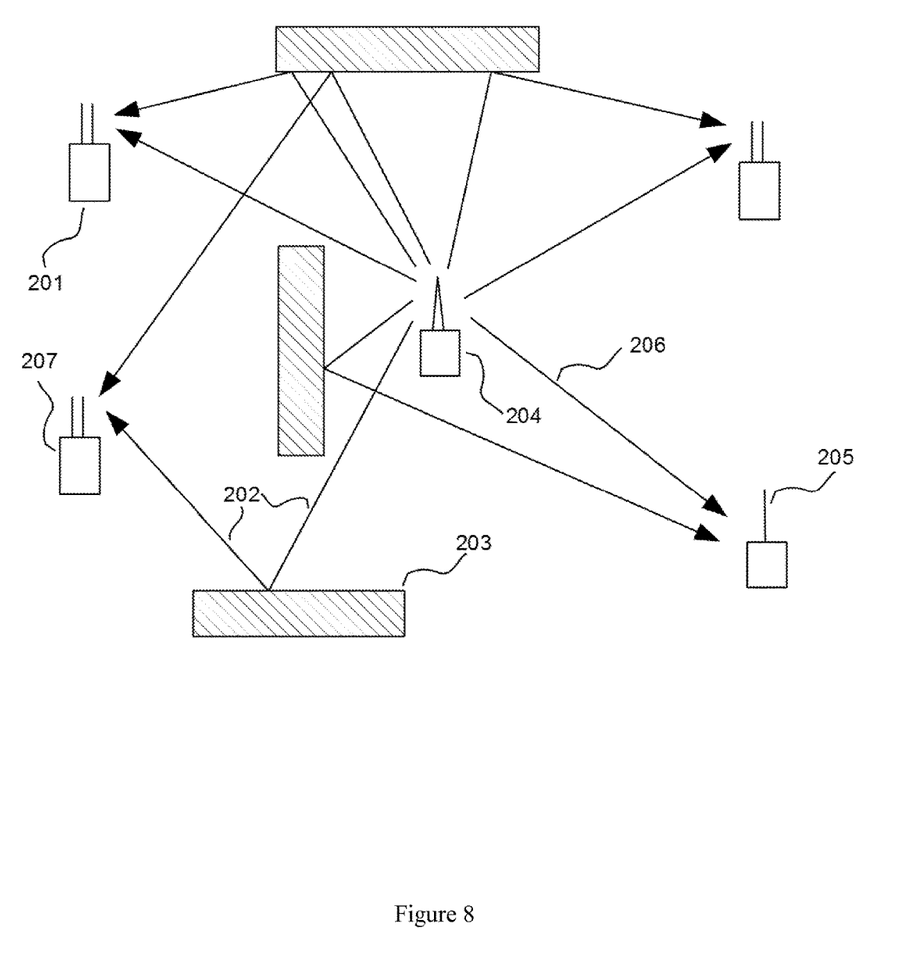
FIG. 8 illustrates a system in accordance with some embodiments of the present inventive concept.

Referring now to FIG. 8, some embodiments of the inventive concept include multiple MDRUs (201 and 207) and single antenna receiver units 205 (SARU). MDRU's and SARU's are henceforth referred to as anchor devices. An example system might be in a distribution warehouse where the aisles, walls, and additional clutter can act as significant obstacles in a wireless environment (203). As can be seen, free-space reflected waves (202), and direct, LOS waves (206) are received by the anchor devices from the transmitter (204). In some embodiments, the system may contain a number of receivers and one or more transmitters.

Upon reception of the transmitter's free-space wave, the anchor devices record the time the signal was received, called the arrival time stamp. The anchor devices can also have a way to maintain clock synchronization with other receiver units. For example, the anchor devices can also contain RF transceivers that send signals to other anchor devices periodically to synchronize their clocks. Alternatively (or additionally) the receiver units can include a precise time keeping element to accurately record the arrival time stamp and reduce the frequency of synchronizing updates. Examples of a precise time keeping element may include temperature controlled crystal oscillators (TCXO), oven controlled crystal oscillators (OCX), or atomic clocks.

With these arrival time stamps, the system incorporates a means to determine distance based on the time it takes a wave to propagate in free space from the transmitter to the receivers as a means to determining the location. Time-of-flight (ToF) and time-difference-of-arrival (TDoF) are two methods for determining distance.

TDoF also includes determining the differences in time of a coded signal like a GPS signal for example. In GPS, there is no arrival time of the signal because it is a continuous stream. However, the transmit pattern is repeated, so the arrival time of the repeated pattern can be used in calculating TDoF. Additional embodiments of the inventive concept may include the implementation of GPS-like algorithms to improve the accuracy of the system. Example techniques include C/A code ranging, carrier-phase ranging, narrow correlators, MEDLL, etc. (see Lawrence R. Weill, "Conquering Multipath: The GPS Accuracy Battle," GPS World April 1997.)

Embodiments of this inventive concept may work on the standard wireless protocols including Wi-Fi, Zigbee, Bluetooth, LTE, CDMA, GSM, etc.

In an environment with multiple reflections, the free-space time flight can be difficult to measure, especially if the LOS wave is small compared to reflected waves.

In some embodiments, MDRU's contain a means to record a time stamp from each of the antennas. In calculating the shortest distance, an algorithm employed locally at the anchor device or centrally located to the system can choose the earlier time stamp of the multiple antennas in the MDRU.

In some embodiments, the data streams from the MDRU's are fed into a processing element. Deconstructor logic within the processing element can deconstruct the data streams to model discrete free-space waves. Attributes of those free-space waves can include angle-of-arrival, phase, magnitude, and/or a packet envelop, for example. An algorithm to determine location of the transmitter can use these attributes in at least two ways: First, an algorithm can calculate the arrival time of the signal not just from the time stamp, but also by using the additional attributes of the decomposed free-space wave such as angle-of-arrival, phase, magnitude, and/or a packet envelop. Second, the location algorithm may use not only ToF or TDoF, but also incorporate the angle-of-arrival attributes of the free space wave.

Building upon this embodiment, an algorithm can be developed to determine the location of obstacles within the environment. The attributes of the free-space waves as calculated by deconstructor and comparing logics associated with each MDRU ca contain angle-of-arrival information and phase information, for example. With the knowledge that 2 pi is equivalent to one full wavelength, the phase differences between discrete free-space waves can be used by the algorithm to determine the difference in path-lengths of the discrete waves. Furthermore, the angle-of-arrival may be used by the algorithm to model the path of the free-space waves. The algorithm can then calculate the possible reflection points such that modeling the path of the free-space waves results in a close correlation between the measured data with the modeled data. In some embodiments, the data streams of multiple MDRU's and SARU's can all be fed into a processing unit. With the locations of the anchor units known, an algorithm can not only determine the location of the transmitter but also the location of obstacles using those data streams.

An example of an algorithm according to some embodiments may be as follows:
1. a digital 3-dimensional or 2-dimensional model of the environment is created
2. locations of the anchor devices are added to the digital model
3. a point for the transmitter is chosen
4. 2-dimensional or 3-dimensional obstacles are created within the digital environment
5. a free-space wave emitted from the transmitter is modeled in the digital environment
6. the corresponding received signal at each antenna is modeled
7. the received signal is compared to the data stream of the actual data
8. The difference in the modeled received signal and the actual data stream is calculated. If the difference is small, then the solution is found. If the difference is too large, the location of the transmitter and/or the obstacles are changed.
9. Return to step 5 (iterate)

The RF signal from a transmitter is not limited to a specific RF protocol or frequency band. Examples of frequency bands on which the system could operate are a ISM band, GPS band, or a cellular phone frequency band. The inventive concept is also not limited to the type of RF protocol used. Examples of RF protocols include IEEE 802.15.14, WiFi, IEEE 802.11, LTE, IEEE 802.11, CDMA, GPS.

Additionally, higher frequencies upwards of the Terahertz band may also be used. In these frequencies, the diffraction of the free-space waves is smaller allowing greater antenna directionality. Additionally, the smaller wavelengths correspond to smaller antenna footprints. This could allow a smaller more compact system, or alternatively, more antennas can be put on the same MDRU. In some embodiments, a transmitter may be part of an existing product. For example, the transmitting unit may be in an existing or new RF unit within a cell phone, laptop, tablet, or any other device that has a means of communicating wirelessly.

In some embodiment, the transmitter could be part of a global navigation satellite system, for example GPS, Galileo, or GLONASS. A MDRU may also be part of a land-based global positioning receiver.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure may become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an operating environment constitutes a machine, hardware, or a combination of software and hardware.

Various embodiments set forth herein may be implemented utilizing hardware, software, or any desired combination thereof. For that matter, any type of logic may be utilized which is capable of implementing the various functionality set forth herein.

Illustrative information is provided above regarding various optional architectures and features with which the foregoing frameworks may or may not be implemented, per the desires of the user. It should be strongly noted that such illustrative information is set forth for illustrative purposes and should not be construed as limiting in any manner. Any of the aspects identified by the illustrative information may be optionally incorporated with or without the exclusion of any other of the aspects.

In the description above, the subject matter is described with reference to acts and symbolic representations of operations that are performed by one or more devices, unless indicated otherwise. As such, it may be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art may appreciate that various of the acts and operation described hereinafter may also be implemented in hardware.

To facilitate an understanding of the subject matter described above, many aspects are described in terms of sequences of actions that may be performed by elements of a computer system. For example, it may be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and nonremovable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an operating environment.

Thus, the subject matter described herein may be embodied in many different forms, and all such forms are contemplated to be within the scope of what is claimed. It may be understood that various details may be changed without departing from the scope of the claimed subject matter.

The use of the terms "a" and "a" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any nonclaimed element as essential to the practice of the inventive concept as claimed.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

I claim:

1. A system comprising:
a multi-directional receiver unit (MDRU) comprising two or more separate receivers, each of the two or more separate receivers having a corresponding antenna, a first of the corresponding antennas having a first antenna pattern and a second of the corresponding antennas having a second antenna pattern, different from the first antenna pattern, the MDRU being configured to receive radio frequency (RF) signals from a wireless transmitter,
wherein the wireless transmitter is configured to emit an RF wave uniformly in all directions, impending waves onto the MDRU constitute first and second RF waves, wherein the first RF wave is a first reflected RF wave and the second RF wave is a second non-reflected direct line of sight (DLOS) RF wave;
wherein the first RF wave has a first impending direction, amplitude and phase onto the first antenna of the MDRU and wherein the second RF wave has a second impending direction, amplitude and phase, different from the first impending direction, amplitude and phase, onto the second antenna of the MDRU;
wherein the first and second antennas are approximately co-located on the MDRU;
wherein the two or more separate receivers include a first receiver receiving both the reflected RF wave and non-reflected DLOS RF wave and recording a stream of phase and magnitude data of a first composite wave and a second receiver receiving both the reflected RF wave and the non-reflected DLOS RF wave and recording the stream of phase and magnitude data of a second composite wave; and
a processing unit to process the stream of phase and magnitude data of the first composite wave and the stream of phase and magnitude data of the second composite wave to deconstruct phase and magnitude data of the first reflected RF wave from the phase and magnitude data of the second non-reflected DLOS RF wave based on the first and second antenna patterns and superposition of the first and second composite waves and determine a shortest propagation path of the first reflected RF wave and the second non-reflected DLOS RF wave based on a comparison of a known phase and magnitude of the first reflected RF wave and the second non-reflected DLOS RF wave, respectively, wherein a shortest propagation path correlates to a smallest phase difference.

2. The system of claim 1, wherein the system further comprises the wireless transmitter and wherein the wireless transmitter transmits at two or more frequencies and wherein first and second receivers receive phase and amplitude data streams from each frequency.

3. The system of claim 1, wherein a large phase difference indicates a larger RF path length relative to RF path lengths associated with small phase differences.

4. The system of claim 1, wherein phase differences are induced by varying transmitted frequencies such that a measured difference of phases is within 2 pi.

5. The system of claim 1, wherein the processing unit is further configured to determine the shortest propagation path by calculating differences over a frequency of phase differences among the RF waves, wherein a phase difference of free-space waves is calculated according to the following equation:

$$\Delta\text{Phase}(f_1)-\Delta\text{Phase}(f_2)=2\pi/c(f_1-f_2)(d_{LOS}-d_{reflect}),$$

where $\Delta\text{Phase}(f_1)$ is a difference in phase of the free-space waves at a first frequency; $\Delta\text{Phase}(f_2)$ is a difference in phase of the free-space waves at a second frequency; $f_1$ and $f_2$ are first and second frequencies; c is a speed through a medium; dos is path distance of a line-of-sight (LOS) wave; and $d_{reflect}$ is path distance of a reflected wave.

6. The system of claim 1, wherein the first and second antenna patterns are provided by rotating at least one of the antennas in one of two dimensions (2D) and three dimensions (3D).

7. The system of claim 1, wherein the first and second antenna patterns are provided using one of a one dimensional (1 D), two dimensional (2D) and three dimensional (3D) array of antennas.

8. The system of claim 1, wherein the received RF waves are phase correlated and time synchronized responsive to a clock reference.

9. The system of claim 8, wherein the clock reference is received from a separate receiver unit with a separate antenna.

10. The system of claim 1 further comprising:
at least one additional MDRU such that all the receivers are at known locations and time synchronized and phase correlated to one another;
a communication link such that each receiver can send data to a computational element used to calculate location; and
a means to calculate the location of the wireless transmitter based on an aggregate of the received data and characteristics of free-space waves as calculated by deconstructing free-space waves of RF signals received at the MDRU.

11. The system of claim 10, wherein the means to calculate the location comprises a means to calculate the location using the shortest propagation path for each multi-directional receiver unit.

12. A method for determining a shortest propagation path in a multi-path environment, the method comprising:
receiving multiple transmitted signals from a transmitter at two or more antennas of a multi-directional receiver (MDRU), the two or more antennas of the MDRU each having a unique antenna pattern for each of the transmitted signals, wherein each of the transmitted signals is phase correlated and time synchronized,
wherein receiving multiple transmitted signals comprises receiving at least first and second RF waves at the MDRU, wherein receiving comprises receiving an RF wave emitted uniformly in all directions, wherein impending waves onto the MDRU constitute the first and second RF waves and wherein the first RF wave is a first reflected RF wave and the second RF wave is a second non-reflected direct line of sight (DLOS) RF wave;

wherein the first RF wave has a first impending direction, amplitude and phase onto a first antenna of the MDRU and wherein the second RF wave has a second impending direction, amplitude and phase, different from the first impending direction, amplitude and phase onto a second antenna of the MDRU wherein the first and second antennas are approximately co-located on the MDRU; and wherein receiving further comprises receiving both the reflected RF wave and non-reflected DLOS RF wave at a first receiver and recording a stream of phase and magnitude data of a first composite wave and receiving both the reflected RF wave and the non-reflected DLOS RF wave at a second receiver and recording the stream of phase and magnitude data of a second composite wave;

processing the stream of phase and magnitude data of the first composite wave and the stream of phase and magnitude data of the second composite wave to deconstruct phase and magnitude data of the first reflected RF wave from the phase and magnitude data of the second non-reflected DLOS RF wave based on the unique antenna patterns of the first and second antennas and superposition of the first and second composite waves; and comparing parameters of a first free-space wave corresponding to the reflected wave and a second of free-space wave corresponding to the DLOS wave to determine a wave with a shortest propagation path, wherein a shortest propagation path correlates to a smallest phase difference, wherein at least one of the receiving, deconstructing and comparing is performed by at least one processor.

13. The method of claim 12, wherein a large phase difference indicates a larger RF path length relative to RF path lengths associated with small phase differences.

14. The method of claim 13, further comprising determining a difference in distance of propagation path of the first and second free-space waves based on a difference in phase of the first and second free-space waves.

15. The method of claim 12, further comprising calculating an arrival time of the transmitted signals using a phase of the first and second free-space waves with the shortest propagation path.

16. The method of claim 12, further comprising rotating at least one of the two or more antennas in one of two dimensions and three dimensions to provide a corresponding unique antenna pattern.

17. The method of claim 12, further comprising using one of a one dimensional (1D), two dimensional (2D) and three dimensional (3D) array of antennas to provide the unique antenna patterns.

18. The method of claim 12, further comprising using a reference clock signal to phase correlate and/or time synchronize the received signals.

* * * * *

UNITED STATES PATENT AND TRADEMARK OFFICE
CERTIFICATE OF CORRECTION

PATENT NO. : 10,451,706 B1
APPLICATION NO. : 14/214604
DATED : October 22, 2019
INVENTOR(S) : Seth Edward-Austin Hollar It is certified that error appears in the above-identified patent and that said Letters Patent is hereby corrected as shown below:

In the Claims

Column 12, Line 22 - "dos" should be -- dLOS --

Column 12, Line 31 - "(1 D)" should be -- (1D) --

Column 13, Line 9 - "amplitude and phase" should be -- amplitude and phase, --

Signed and Sealed this
Nineteenth Day of November, 2019

Andrei Iancu
*Director of the United States Patent and Trademark Office*